United States Patent [19]

Utsch et al.

[11] Patent Number: 4,523,088
[45] Date of Patent: Jun. 11, 1985

[54] CODE BAR FOR IDENTIFICATION OF SERIES PARTS

[76] Inventors: Joachim Utsch, Alte Dreisbachstrasse 19, D-5900 Siegen 31; Theo Morgenschweis, Am Altenberg 8, D-5908 Neunkirchen 3, both of Fed. Rep. of Germany

[21] Appl. No.: 495,076

[22] Filed: May 16, 1983

[30] Foreign Application Priority Data

May 14, 1982 [DE] Fed. Rep. of Germany ....... 3218223

[51] Int. Cl.³ .......................................... G06K 13/107
[52] U.S. Cl. .................................. 235/487; 235/462; 235/489
[58] Field of Search ...................... 235/487, 489, 462; 40/632, 625

[56] References Cited

U.S. PATENT DOCUMENTS 3,918,029 11/1975 Lemelson ............................ 235/472

Primary Examiner—Harold I. Pitts
Attorney, Agent, or Firm—Young & Thompson

[57] ABSTRACT

A code bar for the identification of series parts, for example vehicle bodies, within an assembly line, with several codings in the form of alternating bright and dark stripes of differing widths, corresponding respectively to the digits 0 through 9, consists of a sheet-metal strip from which the dark stripes of the codings have been punched out as slots. The sheet-metal strip is preferably edged twice, preferably along the narrow sides, in order to form mounting flanges, so that the codings are arranged at a spacing from the series part, and exhibits longitudinal crimps in the proximity of the longitudinal borders.

3 Claims, 6 Drawing Figures

CODE BAR FOR IDENTIFICATION OF SERIES PARTS

BACKGROUND OF THE INVENTION

The invention relates to code bars for the identification of series parts, for example vehicle bodies, within an assembly line, with several codings corresponding each to the digits 0 through 9 in the form of alternating bright and dark stripes of differing widths.

The numerical identification of series parts, stored articles and sales articles or the like with the aid of code bars is conventional. These code bars in the form of dark, narrow or wide stripes have heretofore been printed on films or packages and thus are not suited for use in assembly lines for series-produced articles, for example automobiles, wherein the manufactured parts pass through stations wherein they are exposed to heat or various liquid baths.

It is furthermore known, for example, from the motor vehicle industry to utilize codings etched on small aluminum plates which are covered with several transparent films pulled off in succession after each respective passage through a treatment bath, in order to remove the layer applied by the treatment bath so that the codings are uncovered. These measures are expensive.

SUMMARY OF THE INVENTION

The invention is based on the object of providing a code bar insensitive to external influences, for example with respect to high temperatures, paint, aggressive fluids, and the like, and retaining its coded information under such conditions.

This object has been attained according to the invention by providing that the code bar is a sheet-metal strip from which the dark stripes of the codings have been punched out as slots.

Suitably, the sheet-metal strip is edged twice along two mutually opposed borders for the formation of mounting flanges.

In a preferred embodiment, the mounting flanges are arranged along the narrow sides of the sheet-metal strip, and the sheet-metal strip has longitudinal crimps for rigidifying purposes in the proximity of the longitudinal borders of the strip.

The punched-out code stripes, arranged at a spacing from the area of a manufactured part due to the angled mounting flanges, generate by their shadow formation the bright-dark pulses which can be evaluated by a corresponding reading system, which latter can be located at a corresponding distance from the code bar and thus is not exposed, either, to the dangers of high temperature, paint baths or aggressive fluid baths. The code bar accompanies a product from the beginning to the end of its assembly line and during this process does not lose its information content. Due to the fact that the code bar is arranged at a spacing from the surface of the manufactured part, the liquid applied in a dipping bath can readily run off.

BRIEF DESCRIPTION OF DRAWING

Three embodiments of the code bar of this invention are illustrated in the drawings wherein.

DESCRIPTION OF THE PREFERRED EMBODIMENT

Figures 1, 2:
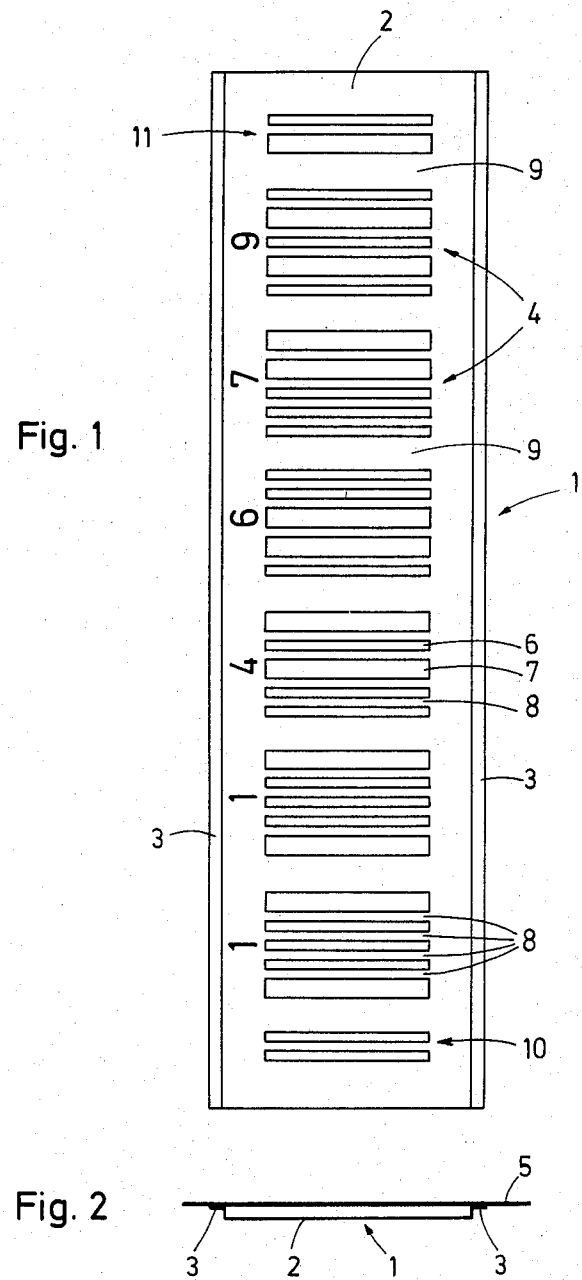
FIG. 1 shows a top view of the code bar in a first example.
FIG. 2 shows a cross section thereof and part of the surface to which it is attached.

The code bar 1 consists of a sheet-metal strip 2, for example of steel, angled at its two longitudinal borders into mounting flanges 3 in such a way that the sheet-metal strip 2 is located with its codings 4 at a distance from the surface of a manufactured part 5, for example the underside of a vehicle body (FIG. 2); the strip can be mounted to this underside, for example, by spot welding. The codings 4 comprise narrow stripes 6 and wide stripes 7 punched out as slots from the sheet-metal strip 2 and having between them bright narrow stripes 8 constituted by the material of the sheet-metal strip 2 which has been left intact.

The individual codings 4 correspond respectively to the digits 0 through 9, and bright narrow stripes 9, likewise from sheet-metal material that has been left intact, separate the codings 4 from each other; in the illustrated embodiment, these codings represent the number or numeric code 114679. Differing initial codings 10 and end codings 11 initiate scanning by a reading system (scanner), not shown, the number, here 114679, being readable from the front as well as from the back. The correct evaluation is ensured by the initial and end codings 10, 11. The bright-dark pulses necessary for interpretation are generated by the stripes 6, 7, 8 while the manufactured part 5 moves past the scanning system.

Figures 3, 4:
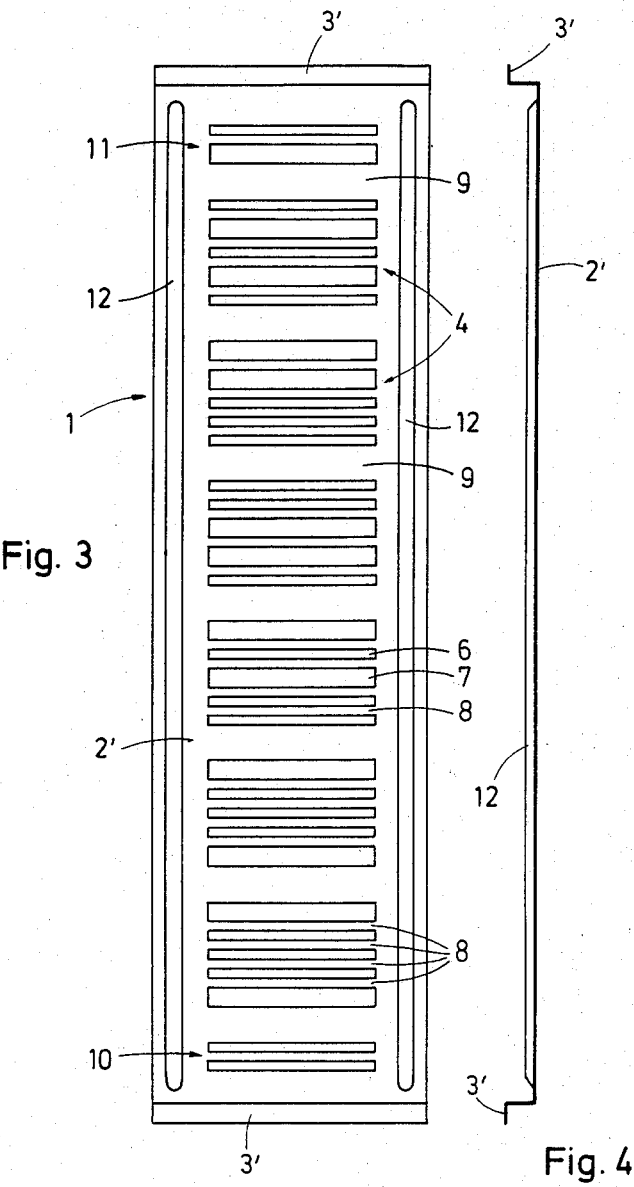
FIG. 3 shows a second embodiment in a top view.
FIG. 4 shows this embodiment in a lateral view.

In the embodiment shown in FIGS. 3 and 4, the mounting flanges 3' are arranged along the narrow sides of the sheet-metal strip 2'. For rigidifying purposes, the sheet-metal strip 2' has longitudinal crimps 12 in the proximity of its wide sides.

Figure 5:
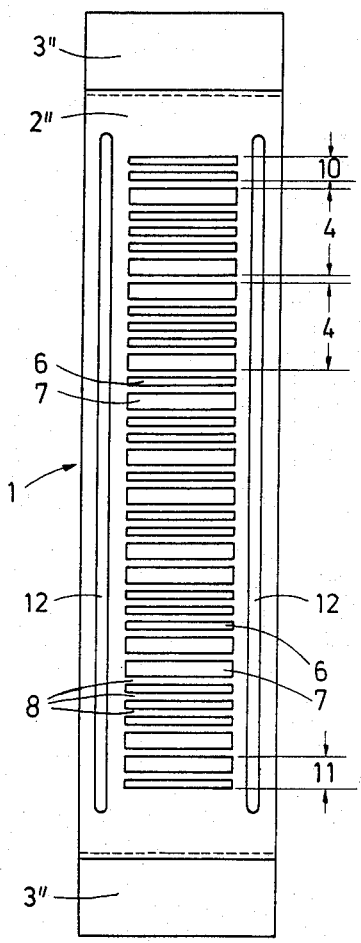
FIG. 5 shows a third embodiment in a top view.
Figure 6:
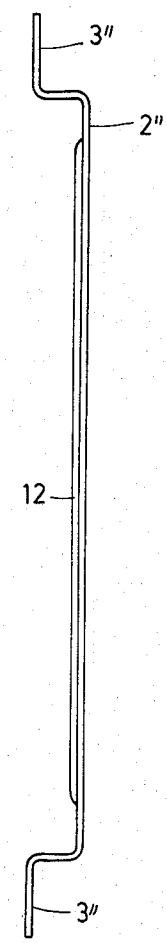
FIG. 6 shows this embodiment in a lateral view.

The preferred embodiment of a code bar 1 shown in FIGS. 5 and 6 differs from the above-described embodiments essentially in that the wide, bright strips 9 of material left intact (FIGS. 1 and 3) between the codings 4 are missing. However, here again respectively two stripes (slots) form the initial and end codings 10 and 11, respectively, and the codings 4, in turn, are again formed by respectively five stripes 6 and 7 in the shape of punched-out slots. The embodiment of FIGS. 5 and 6 in total can be made of a smaller size. The mounting flanges 3" are broader as compared to those in FIGS. 3 and 4. Otherwise, this embodiment corresponds to that of FIGS. 3 and 4.

We claim:

1. Code bar for the identification of series parts, for example vehicle bodies, within an assembly line, with several codings in the form of alternating bright and dark stripes of differing widths, corresponding respectively to the digits 0 through 9, characterized in that the code bar (1) is a sheet-metal strip (2, 2') from which the dark stripes (6, 7) of the codings (4) are punched out as slots.

2. Code bar according to claim 1, characterized in that the sheet-metal strip (2, 2') is edged twice along two mutually opposed borders for the formation of mounting flanges (3, 3').

3. Code bar according to claim 2, characterized in that the mounting flanges (3') are arranged along the narrow sides of the sheet-metal strip (2'), and that the sheet-metal-strip (2') exhibits longitudinal crimps (12) in the proximity of the longitudinal borders.

* * * * *